No. 840,141. PATENTED JAN. 1, 1907.
C. H. LEGGETT.
POWDER DISTRIBUTER.
APPLICATION FILED JULY 31, 1906.
2 SHEETS—SHEET 1.
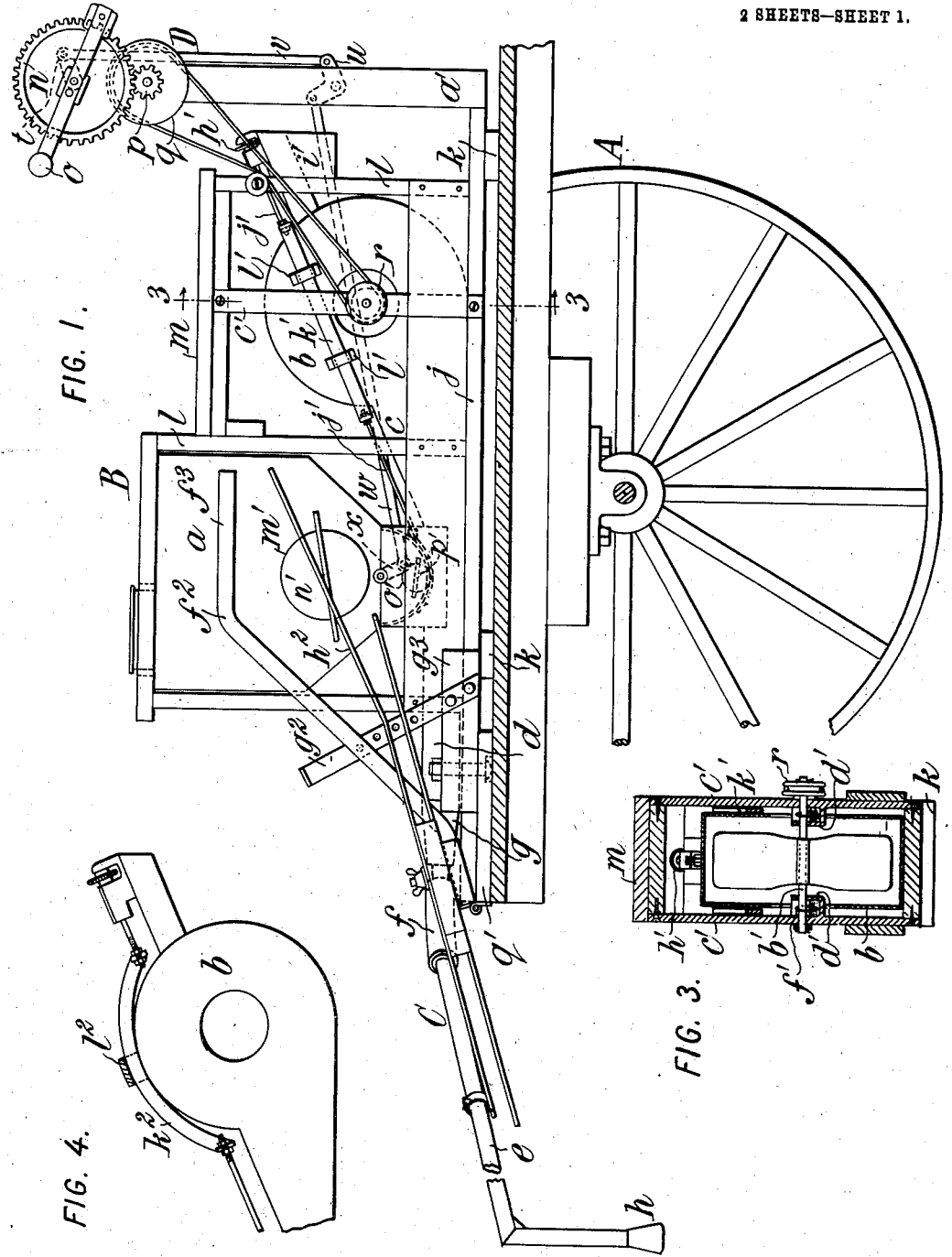
WITNESSES.
Fred White
René Muine
INVENTOR:
Clinton H. Leggett,
By Attorneys,
Arthur C. Fraser & Usina

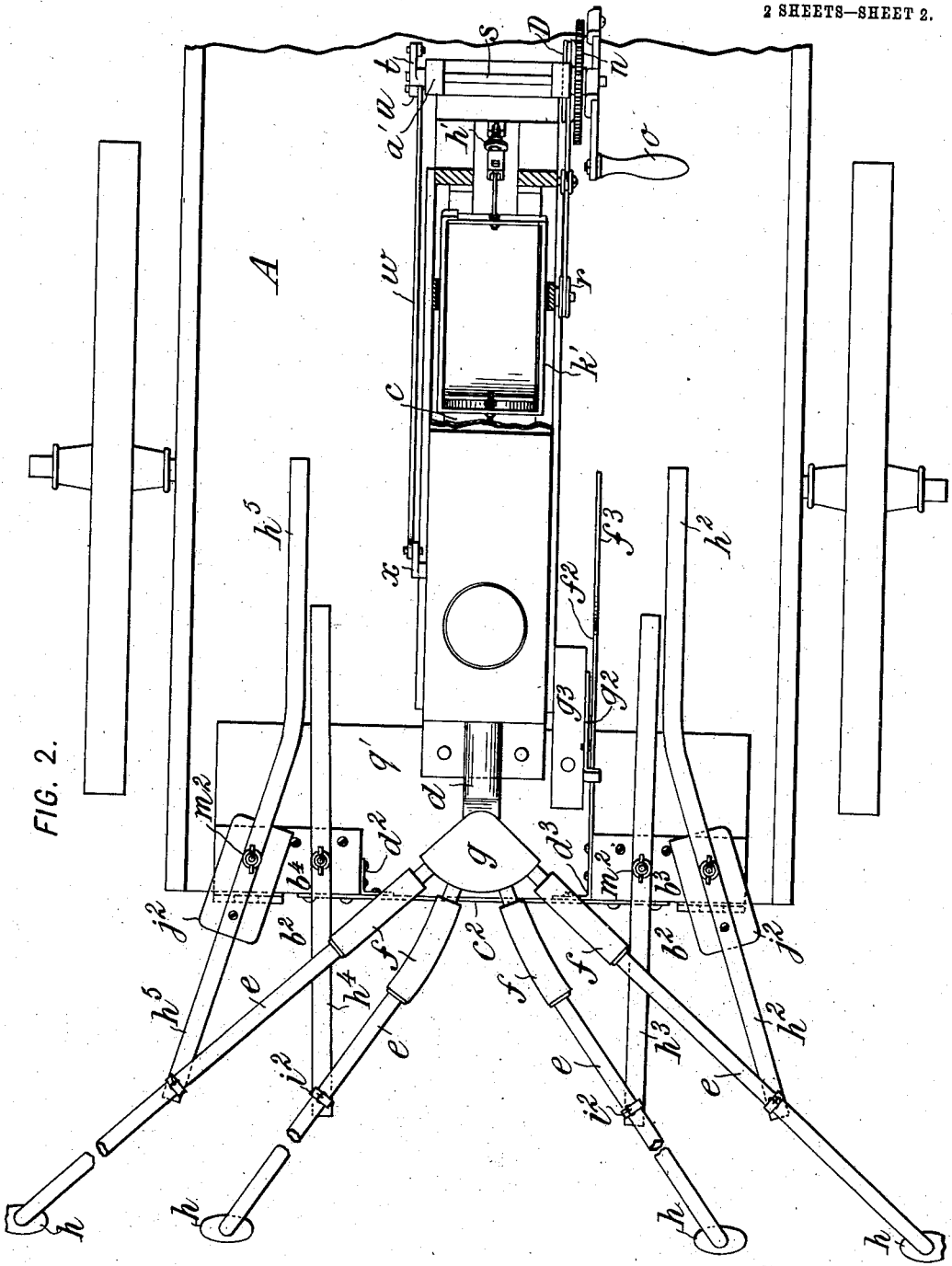

UNITED STATES PATENT OFFICE.

CLINTON H. LEGGETT, OF NEW YORK, N. Y.

POWDER-DISTRIBUTER.

No. 840,141.  Specification of Letters Patent.  Patented Jan. 1, 1907.

Application filed July 31, 1906. Serial No. 328,507.

*To all whom it may concern:*

Be it known that I, CLINTON H. LEGGETT, a citizen of the United States, residing in the borough of Manhattan, city, county, and State of New York, have invented certain new and useful Improvements in Powder-Distributers, of which the following is a specification.

This invention relates to powder-distributers of the general type illustrated in my application, Serial No. 265,799, filed June 17, 1905. In that application I have described and claimed an insecticide-distributer designed to simultaneously deliver the powder or other insecticide to a plurality of rows of plants, the distributing mechanism being carried upon a suitable vehicle adapted to be propelled by a horse or other animal or in any other convenient manner. The type of vehicle illustrated in that application and that which is ordinarily employed is a two-wheeled cart of special construction provided with means for connecting the axle to the distributer proper. It occasionally happens that a customer already has a vehicle which might be adapted for use in this connection; and it is the principal object of my present invention to provide a distributing mechanism proper which can be set up and used with such a vehicle, so as to avoid the necessity of purchasing a special cart designed for this purpose. To this end I provide a powder-distributer proper which is adapted to be applied to an ordinary cart or wagon and which is capable of performing all of the functions required in this type of distributer.

Referring to the drawings, which illustrate several embodiments of my invention, Figure 1 is a side elevation of the preferred form of my improved device. Fig. 2 is a plan. Fig. 3 is a section on the line 3 3 in Fig. 1. Fig. 4 is an elevation of a modification.

Referring first to Figs. 1 and 2, let A indicate a vehicle of any common form, that shown being a farm-cart of the usual type. The powder-forcing mechanism B comprises a reservoir $a$ and a fan $b$, adapted to force a current of air through the passage $c$, such current carrying with it the powder, which is dropped from the bottom of the reservoir $a$. This general type of distributer is illustrated in my aforesaid application, to which reference is made for a detailed description thereof. C indicates the distributing mechanism, which is connected to the pipe $d$ at the end of the passage $c$, as best seen in Fig. 2, and comprises a series of tubes or pipes $e\ e$, which are connected by flexible pipes $ff$ to a distributing-nozzle $g$, provided with branches corresponding in number to the delivery-pipes $e$. Each of the distributing-pipes is preferably provided with some form of delivery-nozzle $h\ h$ for spreading the insecticide over the plants.

According to my invention I form the powder forcing mechanism and distributing mechanism as separable from the cart and preferably from each other, by preference so mounting each of such mechanisms that it may be conveniently transported and applied to the cart and operated by the user. My invention also provides certain improvements in the construction of such mechanisms, which will be hereinafter described in detail.

Referring first to the powder-forcing mechanism, I preferably mount the reservoir $a$ and the fan $b$ and the means for operating it upon a base-board $j$, such base-board being adapted to be mounted either directly upon the floor of the cart or upon cross-pieces $k\ k$, as shown in Fig. 1. I preferably provide a framework $l$, which surrounds the powder-forcing mechanism and by means of which it is connected to the base-board. By this construction such mechanism can be easily applied to or removed from the ordinary cart. My invention provides an important improvement in this type of mechanism which is of particular value in connection with the construction just described, although it may be employed with any other type of powder-distributer adapted to be used upon a vehicle. This comprises a means for operating the powder-forcing mechanism, which is located at such a point that it may be operated by the driver while facing forward in the cart. By this means a single person can guide the horse or other animal and at the same time operate the distributer. I preferably so construct the frame $l$ as to provide a seat, such as $m$, upon which the driver may sit, and forwardly of such seat I arrange the operating mechanism D within convenient reach of the driver. Such operating mechanism may be of any suitable construction, that shown comprising a large gear $n$, designed to be driven by a counterweighted handle $o$ and meshing with a pinion $p$, which is connected to a pulley $q$, belted to a pulley $r$ upon the shaft of the fan $b$. At the opposite end of the shaft $s$, upon which the gear $n$ is mounted, I fix a crank-arm $t$, which is connected to one arm of a bell-crank lever $u$ by a rod $v$, the other arm of such lever being connected by a rod $w$ to a crank-arm $x$, carried upon the agitator-shaft. The agitator may be of any suitable construction—as, for instance, that shown in my aforesaid application. The proportions of the parts are such that as the crank $t$ is rotated the crank-arm $x$ is oscillated, thereby producing a to-and-fro movement of the agitator. The operating mechanism is mounted upon a frame $a'$, suitably connected to the base-board $j$.

The fan-shaft $b'$ is preferably mounted in bearings formed in two uprights $c'$ $c'$, which are formed on their interiors with pockets or recesses $d'$ $d'$, designed to receive oil or other lubricant, and upon the shaft $b'$ within each of the recesses $d'$ is mounted a ring $f'$, the lower part of which dips in the lubricant in the recess. As the shaft is turned it imparts a rotative movement to the rings, which carry up with them sufficient oil to lubricate the shaft-bearings.

Another feature of improvement provided by my invention relates to the means for adjusting the effective passage for the powder from the reservoir A into the passage $c$. Such passage is controlled by a valve or gate of any usual construction—as, for instance, that shown in dotted lines in Fig. 1—this forming no part of my present invention, which is directed to a means for operating the valve from a point which is convenient to the driver, and preferably directly in front of the driver's seat. I mount the adjusting-nut or other suitable adjusting means $h'$ upon a block $i'$, fixed to the front part of the framework $l$, and connect such adjusting-nut with the reservoir valve or gate by a rod $j'$. The upper part of the fan-casing, however, extends directly between the adjusting-nut and the valve, and I therefore provide the rod $j'$ with a frame or yoke $k'$, which surrounds the fan-casing, such yoke being preferably held in guides $l'$ $l'$, as shown in Fig. 1. A modified construction is shown in Fig. 4, wherein the yoke $k'$ instead of passing around the sides of the fan-casing passes over the top thereof, as shown at $k^2$, a suitable guide $l^2$ being provided at the top of the casing.

In order to afford convenient access to the reservoir $a$, so that the latter may be cleaned or inspected, I provide an enlarged opening $m'$ in its side, such opening being preferably closed by a screw-cap $n'$. When the cap is removed, the agitating mechanism may be inspected or repaired without the necessity of dismounting the reservoir. A similar but smaller opening $o'$, closed by a cap $p'$, is preferably provided below the agitator, as shown in Fig. 1. Such opening is of service in freeing the passage $c$ in case it should become clogged.

The distributing mechanism C is preferably so mounted that it may be disconnected from the powder-forcing mechanism for purposes of shipment and connected thereto when the device is set up for use. Such mechanism is preferably mounted upon a base-board $q'$, which is adapted to extend transversely of the cart, as shown, such base-board being bolted to the base-board $j$ of the powder-forcing mechanism, so that it may be easily attached thereto and detached therefrom. The base-board $q'$ is adapted to carry the whole or the greater part of the distributing mechanism, so that the latter, with the powder-forcing mechanism, may be compactly crated or boxed for shipment. Such distributing mechanism is preferably provided with means for adjusting the distributing-pipes laterally to suit the device for differently-spaced rows and for raising and lowering the distributing-pipes as a whole. This mechanism includes several novel features which are applicable to distributers of other types.

The means for adjusting the series of pipes as a whole preferably comprises a tilting support $b^2$, having two sections $b^3$ $b^4$, Fig. 2, each of which is hinged to the base $q'$. The sections $b^3$ $b^4$ are connected together by a metal strip $c^2$, fixed to the rear of the two sections, the parts being strengthened by angle-irons $d^2$ $d^3$, riveted to the strip $c^2$ and secured by screws or otherwise to the sections $b^3$ $b^4$. The member $b^2$ is thus made in two sections, so that it may be tilted without interfering with the distributing-nozzle $g$. The tilting member $b^2$ may be arranged so that it extends backwardly beyond the base-board $q'$ instead of forwardly over such board, as shown. I prefer the construction illustrated, however, for the reason that it enables the base-board $q'$ to be placed forwardly upon the cart beyond its tail, so that no particular care need be exercised in adjusting the device upon the cart. For the purpose of adjusting the member $b^2$ so as to vary the height of the delivery-nozzles above the ground I provide a lever $f^2$, which is fixed at one end to the member $b^2$ and is preferably formed as a continuation of the angle-piece $d^3$, as shown in Fig. 2. The lever $f^2$ is extended forwardly to a point within easy reach of the driver, being preferably provided with a handle-piece $f^3$, so that it may be more conveniently operated. To hold the lever $f^2$, and hence the distributing-pipes, in adjusted positions, I provide an arm $g^2$, fixed to a block $g^3$, which may be fastened to the base-board $q'$ or to the base-board $j$, as desired. The arm is provided with a series of holes into which a pin carried by the lever may enter.

By my invention I provide means for individually adjusting the distributing-pipes $e$ transversely of the device, such means being operable from the cart while in motion. I preferably also utilize the same means to support the distributing-pipes in their several positions. Such means preferably comprise levers $h^2$ $h^3$ $h^4$ $h^5$, all of which are pivoted to the tilting member $b^2$. The two inner levers $h^3$ $h^4$ are formed of straight rods of iron or wood pivoted at their middles and at their outer ends extending beneath the middle distributing-pipes. Each of the levers is connected to the pipe by a strap $i^2$, such straps fitting the pipes loosely, so as to slide along the latter as the levers are turned. The two outer levers $h^2$ $h^5$ are mounted upon blocks $j^2$ $j^2$, which are pivoted to the tilting member $b^2$, this construction being adopted to elevate the outer pipes, so as to provide a space beneath them for the levers $h^3$ $h^4$. The levers $h^2$ $h^5$ instead of being made straight, as are the inner levers, have their ends bent outwardly and upwardly, as shown in Figs. 1 and 2, so as to permit them to be manipulated without striking the powder-forcing mechanism. Thumb-nuts $m^2$ $m^2$ are preferably provided for clamping the several levers in their adjusted positions, if desired.

By the construction just described I am enabled to gain an important advantage in that the distributing-pipes may be adjusted from the driver's seat or while the vehicle is in motion, thus accommodating the device to any change in the spacing of the rows. A further important advantage is that all of the distributing-pipes may be brought within the width of the cart, so as to avoid accidents in passing through gateways or other restricted places.

It will be observed that by reason of my invention I am enabled to avoid the use of a special cart, although my invention is capable of use therewith, if desired, also that I provide a mechanism which may be manually operated by a single person while driving the horse or otherwise guiding the vehicle. It will also be seen that the entire mechanism is extremely simple and economical in its nature and is at the same time very efficient in use.

Although I have described in detail the preferred construction of my device, it will be understood that I do not wish to be limited thereto, as various changes may be made therein without departing from the invention. It will also be understood that while I have described my invention with reference to a device for distributing powder it is also applicable to devices for distributing liquid insecticide.

I claim as my invention—

1. In an insecticide-distributer, the combination of a powder-forcing means and a powder-distributing means, such distributing means including a series of distributing-pipes and means for adjusting them laterally, such forcing and distributing means being adapted to be detachably connected, means for supporting such powder-forcing means, and means for supporting such distributing means, the respective supporting means being separable, so that such powder forcing and distributing means may be separately mounted and dismounted.

2. In an insecticide-distributer, the combination of a powder-forcing means and a powder-distributing means, such distributing means including a series of distributing-pipes and means for adjusting them laterally, such forcing and distributing means being adapted to be detachably connected, and a separate base for each of such means adapted to permit it to be separately mounted and dismounted.

3. In an insecticide-distributer, the combination of a powder-forcing means and a powder-distributing means, such powder-forcing means including a fan, a reservoir, an agitator, and means for actuating such fan and agitator, and such distributing means including a series of distributing-pipes, and means for adjusting them laterally and vertically, and separate supporting devices for such powder forcing and distributing means adapted to permit them to be independently mounted.

4. In an insecticide-distributer, the combination of a powder-forcing means and a powder-distributing means, such powder-forcing means including a fan, a reservoir, an agitator, and means for actuating such fan and agitator, and such distributing means including a series of distributing-pipes, means for vertically adjusting such pipes collectively, means for individually adjusting them laterally, and separate supporting devices for such powder forcing and distributing means adapted to permit them to be independently mounted.

5. In an insecticide-distributer, a base, a member hinged thereto, a series of levers pivoted to said member, a series of distributing-pipes connected with said levers and adapted to be individually adjusted thereby, a lever for tilting said hinged member, fixed thereto, and means for connecting such base to a vehicle.

6. In an insecticide-distributer, a vehicle, a series of distributing-pipes thereon, and a series of levers, each connected to a single distributing-pipe, whereby each pipe may be individually adjusted, said levers extending forwardly so as to be operable from the body of the vehicle.

7. In an insecticide-distributer, a vehicle, a series of distributing-pipes thereon, and a series of levers, each connected to a distributing-pipe, said levers extending forwardly so as to be operable from the body of the vehicle, and one of said levers having a portion extended angularly in a lateral direction, so as to avoid contact with other portions of the device.

8. In an insecticide-distributer, a vehicle, a distributing-pipe, a lever adapted to move such distributing-pipe, a second distributing-pipe, and a lever adapted to move the latter, such lever being arranged at a higher level than the first lever whereby to avoid interference between the two.

9. In an insecticide-distributer, a baseboard, a tilting member hinged to said board and extending over the same, a lever for moving such member, a series of distributing-pipes, and means upon such member for supporting such pipes.

10. In an insecticide-distributer, a baseboard, a tilting member hinged to said board and extending over the same, a lever for moving such member, a series of distributing-pipes, and levers mounted upon such member for supporting such pipes.

11. In an insecticide-distributer, the combination with a vehicle having a seat, of an insecticide-distributing mechanism mounted upon said vehicle, and means for manually actuating said mechanism arranged close to said seat so as to be operated by the operator while facing forwardly therein.

12. In an insecticide-distributer, the combination with a vehicle, of an insecticide-distributing mechanism, means for manually actuating said mechanism, and a seat adapted to be straddled by the operator arranged at rear of said means and close to the latter, so that such means may be operated by the operator while facing forwardly in said seat.

13. In an insecticide-distributer, the combination with a vehicle, of an insecticide-distributing mechanism having a fan, a seat extended over such fan, and an operating mechanism operable from such seat.

14. In an insecticide-distributer, the combination with a vehicle having a seat, of an insecticide-distributing mechanism, and means for manually actuating said mechanism arranged in front of said seat and within reach of the operator.

15. In an insecticide-distributer, the combination of a reservoir, a fan, and an adjusting means for regulating the passage of insecticide from such reservoir, such adjusting means having a portion extending around said fan.

16. In an insecticide-distributer, the combination of an insecticide-forcing mechanism, a distributing mechanism, and separate means for mounting such mechanisms, such means being adapted to be detachably connected.

17. In an insecticide-distributer, the combination of an insecticide-forcing mechanism, a distributing mechanism, a frame for said forcing mechanism and a base for said distributing mechanism, said insecticide forcing and distributing mechanisms being detachably connected.

In witness whereof I have hereunto signed my name in the presence of two subscribing witnesses.

CLINTON H. LEGGETT.

Witnesses:
EUGENE V. MYERS,
FRED WHITE.